(12) United States Patent
Kuo et al.

(10) Patent No.: US 11,050,868 B2
(45) Date of Patent: *Jun. 29, 2021

(54) INTERNET PHONE SYSTEM

(71) Applicant: PEGATRON CORPORATION, Taipei (TW)

(72) Inventors: Yu-Ti Kuo, Taipei (TW); Wen-Hsieh Hsieh, Taipei (TW); Chao-Tang Chiu, Taipei (TW); Chien-Yi Lee, Taipei (TW); Hsiao-Wen Lee, Taipei (TW); Ching-Jen Wang, Taipei (TW)

(73) Assignee: Pegatron Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/449,931

(22) Filed: Jun. 24, 2019

(65) Prior Publication Data

US 2019/0312963 A1  Oct. 10, 2019

Related U.S. Application Data

(63) Continuation of application No. 15/265,493, filed on Sep. 14, 2016, now Pat. No. 10,397,385.

(30) Foreign Application Priority Data

Dec. 22, 2015 (TW) ................................ 104143165

(51) Int. Cl.
*H04M 1/21* (2006.01)
*H04M 1/02* (2006.01)
*H04M 1/253* (2006.01)
*H04M 7/00* (2006.01)

(52) U.S. Cl.
CPC ........... *H04M 1/21* (2013.01); *H04M 1/0297* (2013.01); *H04M 1/2535* (2013.01); *H04M 7/006* (2013.01)

(58) Field of Classification Search
CPC ...................................................... H04L 12/50
USPC ........................................................ 370/400
See application file for complete search history.

(56) References Cited

U.S. PATENT DOCUMENTS

2006/0211460 A1   9/2006 Jeong et al.
2017/0180525 A1* 6/2017 Kuo ........................ H04M 1/21

FOREIGN PATENT DOCUMENTS

| JP | 10155013 | 6/1998 |
|---|---|---|
| TW | 2008-39528 A | 10/2008 |
| TW | 201541762 A | 11/2015 |
| WO | WO 2009/137117 A1 | 11/2009 |

\* cited by examiner

*Primary Examiner* — Dang T Ton
(74) *Attorney, Agent, or Firm* — Muncy, Geissler, Olds & Lowe, P.C.

(57) ABSTRACT

An internet phone system includes an internet phone main body, an expansion device and a multiple-layer connecting card. The internet phone main body includes a first connecting port. The at least one expansion device includes a second connecting port. One end of the multiple-layer connecting card is connected to the first connecting port, and the other end is connected to the second connecting port such that the internet phone main body can be electrically connected to the expansion device via the multiple-layer connecting card. The expansion device is capable of combining with another expansion device by another multiple-layer connecting card.

9 Claims, 8 Drawing Sheets

INTERNET PHONE SYSTEM

CROSS-REFERENCE TO RELATED APPLICATIONS

This non-provisional application claims priority of Application No. 104143165 filed in Taiwan on Dec. 22, 2015 under 35 U.S.C. § 119, the entire contents of which are hereby incorporated by reference.

BACKGROUND OF THE INVENTION

1. Technology Field

The present invention relates to an internet phone system; more particularly, the present invention relates to an internet phone system can reduce electromagnetic interference.

2. Description of the Related Art

Voice over IP (VoIP) is a network technology which allows a user to talk to other people via the internet. VoIP telecommunication is very convenient and allows the user to talk to other people in foreign areas with low or no cost. Therefore, VoIP telecommunication is welcomed by users, and products employing VoIP technology are also provided by some manufacturers. As shown in FIG. 1, an internet phone 500, an expansion module 600, and a wire 700 are devices employing VoIP technology. The internet phone 500 can execute digital processing of audio signals. After the digital processing, the audio signals can be transferred to another user via the internet. The internet phone 500 can be connected to the wire 700 to transfer signals to another device. The expansion module 600 has a monitor which can display information of an interlocutor (such as the name, the telephone, etc.). The expansion module 600 can be connected the internet phone 500 by the wire 700 and receive a signal transferred from the internet phone 500. Whereby, when a user uses the internet phone 500 to talk to at least one interlocutor, the internet phone 500 will transfer signals to the expansion module 600 via the wire 700, and the monitor of the expansion module 600 will display the information of the at least one interlocutor.

The internet phone 500 and the expansion module 600 both include the RJ45 ports for connecting the wire 700. However, the impedance conversion is existed between the RJ45 ports and the circuits of the board such that strong electromagnetic interference (EMI) in signals may be generated. In addition, the wire 700 exposed to the outside is easily removed from the internet phone 500 or the expansion module 600 the by external force. Therefore, this wire connection is unstable, and a certain space is occupied by the exposed wire 700.

SUMMARY

It is an object of the present invention to provide an internet phone system which does not require the traditional wire connection and can reduce electromagnetic interference.

To achieve the abovementioned object, the internet phone system of the present invention includes an internet phone main body, an expansion device and a multiple-layer connecting card. The internet phone main body includes a first connecting port. The at least one expansion device includes a second connecting port. One end of the multiple-layer connecting card is connected to the first connecting port, and the other end of the multiple-layer connecting card is connected to the second connecting port, such that the internet phone main body is electrically connected to the expansion device via the multiple-layer connecting card, wherein the expansion device is capable of combining with another expansion device by another multiple-layer connecting card.

According to one embodiment of the present invention, the multiple-layer connecting card includes a circuit board and two metal plates, the circuit board is electrically connected to the internet phone main body and the expansion device, and the circuit board is located between the two metal plates.

According to one embodiment of the present invention, the multiple-layer connecting card further includes a fastening hole, and the expansion device further includes a fastening unit. The fastening unit passes through the fastening hole such that the multiple-layer connecting card is fastened to the expansion device.

According to one embodiment of the present invention, the multiple-layer connecting card further includes two contacts. The two contacts are electrically connected to the circuit board and respectively located at two opposite ends of the multiple-layer connecting card.

According to one embodiment of the present invention, the internet phone main body further includes at least one first holding unit, and the expansion device further includes at least one holding plate. The holding plate and the first holding unit are fastened to each other.

According to one embodiment of the present invention, the quantities of the expansion device and the multiple-layer connecting card are plural numbers. The internet phone main body and one of the expansion devices are combined with each other by one of the multiple-layer connecting cards. The one of the expansion devices and another expansion device are combined with each other by another multiple-layer connecting card.

According to one embodiment of the present invention, each expansion device further includes a third connecting port, and the third connecting port is provided for connecting the another multiple-layer connecting cards.

According to one embodiment of the present invention, two opposite ends of the another multiple-layer connecting card are respectively connected to the third connecting port of the expansion devices and the second connecting port of the another expansion device.

According to one embodiment of the present invention, each expansion device further includes at least one second holding unit, and the second holding unit and the holding plate of another expansion device are fastened to each other.

According to one embodiment of the present invention, the fastening unit is a screw, and the fastening hole is a screw hole.

The multiple-layer connecting card of the present invention replaces the traditional wire to connect the internet phone main body and the expansion device in cost and space saving way.

DETAILED DESCRIPTION OF THE PREFERRED EMBODIMENT

These and other objects and advantages of the present invention will become apparent from the following descriptions of the accompanying drawings, which disclose several embodiments of the present invention. It is to be understood that the drawings are to be used for purposes of illustration only and not as a definition of the invention.

Figure 1:
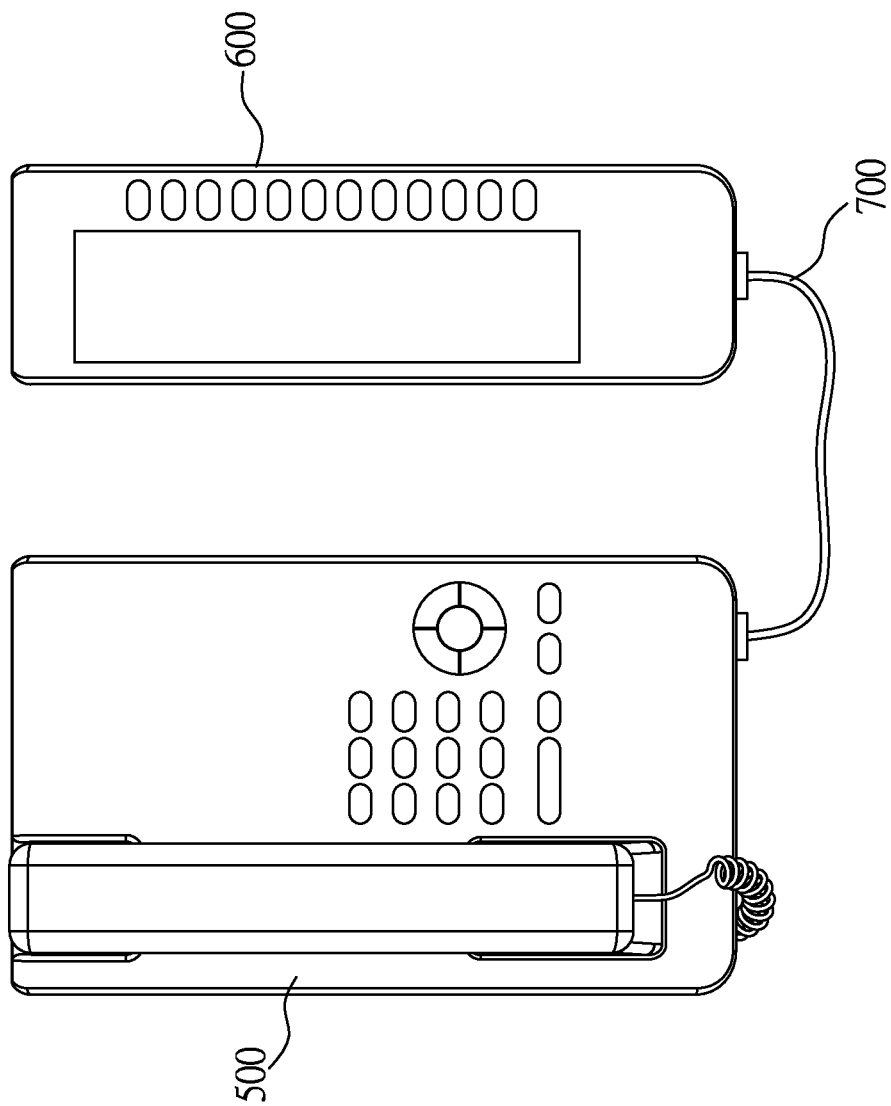
FIG. 1 illustrates a schematic drawing of the internet phone, the expansion module and the wire of the prior art.
Figure 2:
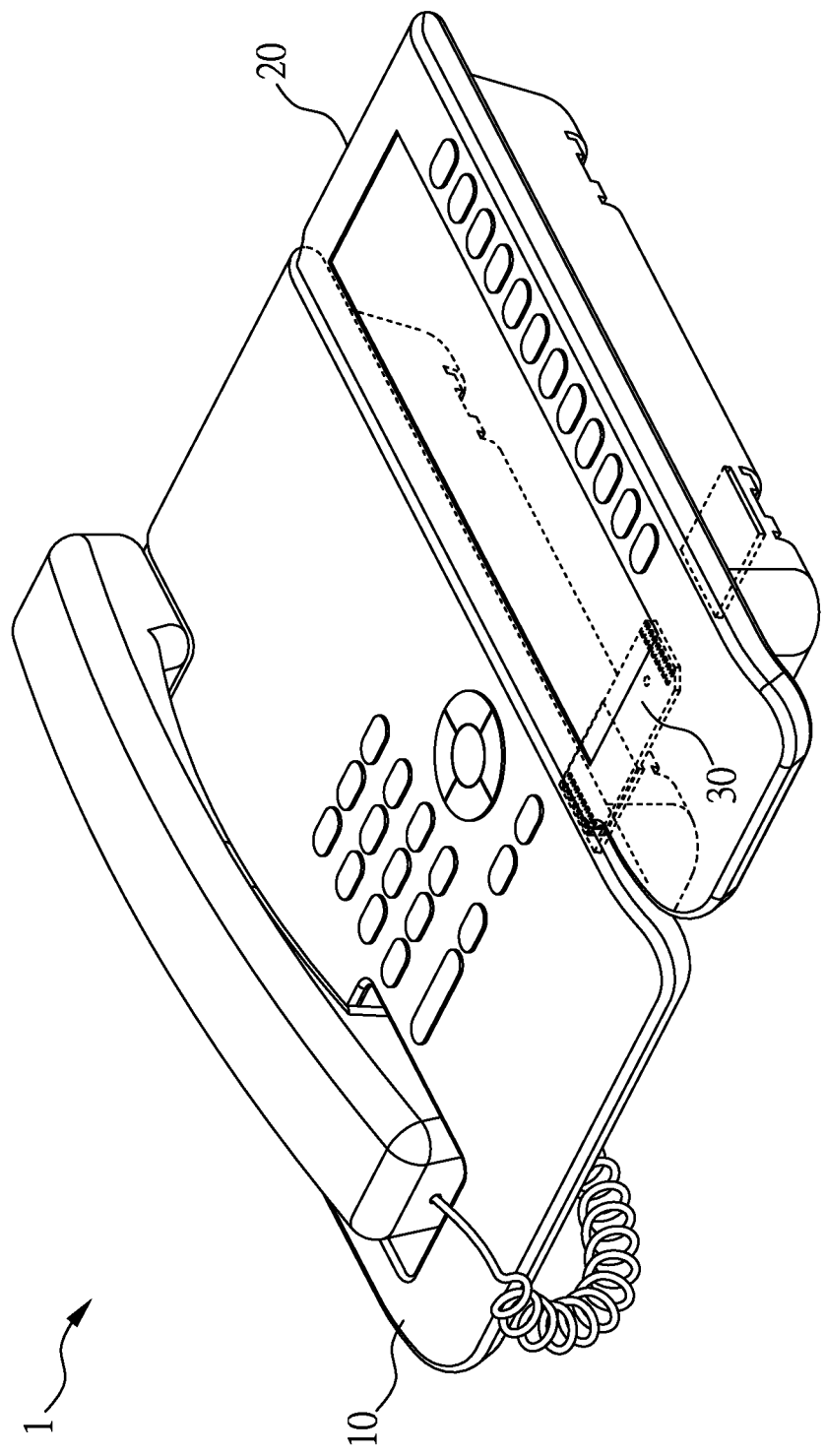
FIG. 2 illustrates a schematic drawing of the first embodiment of the internet phone system of the present invention.
Figure 3:
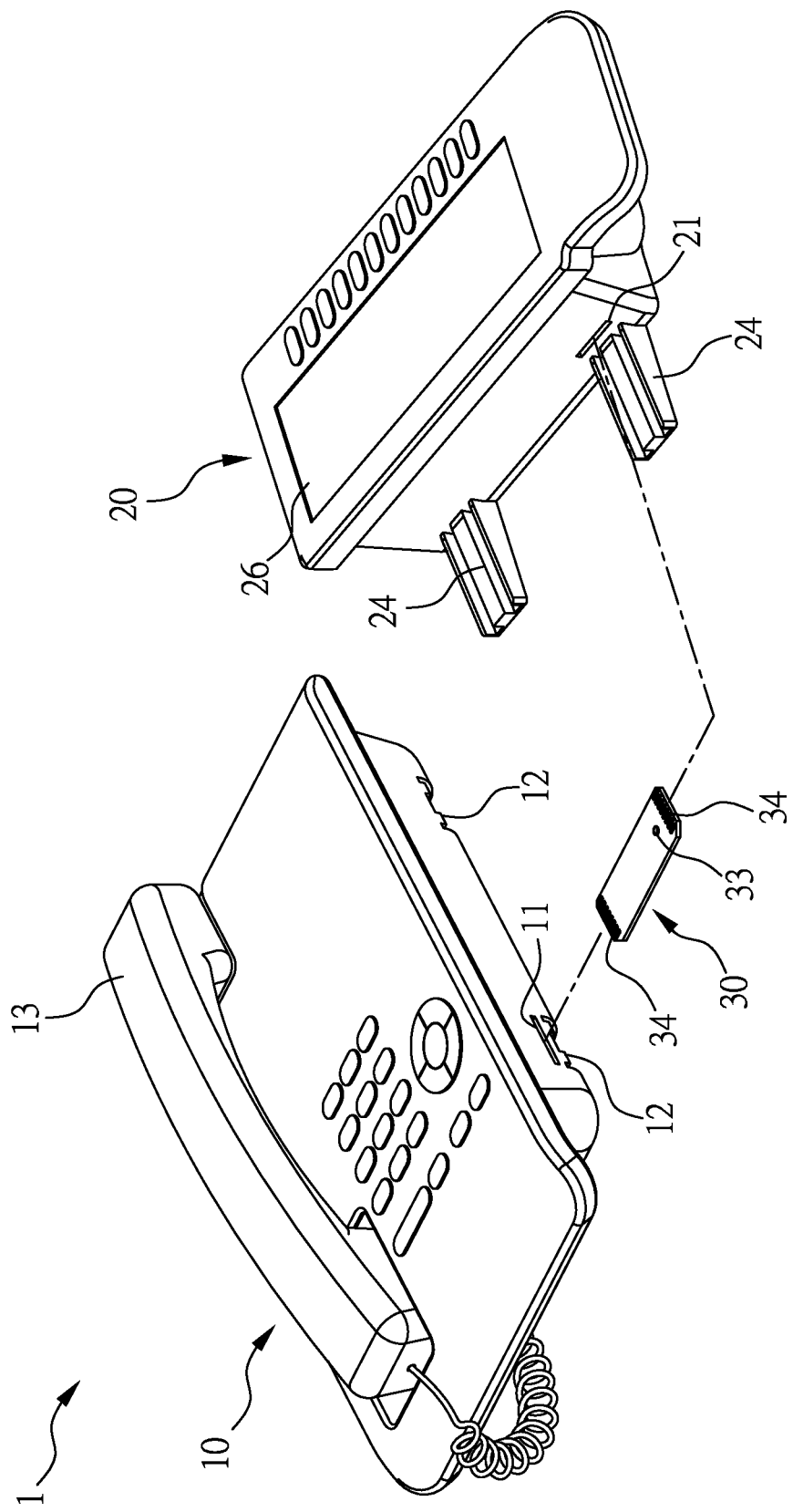
FIG. 3 illustrates an exploded perspective view of the first embodiment of the internet phone system of the present invention.
Figure 4:
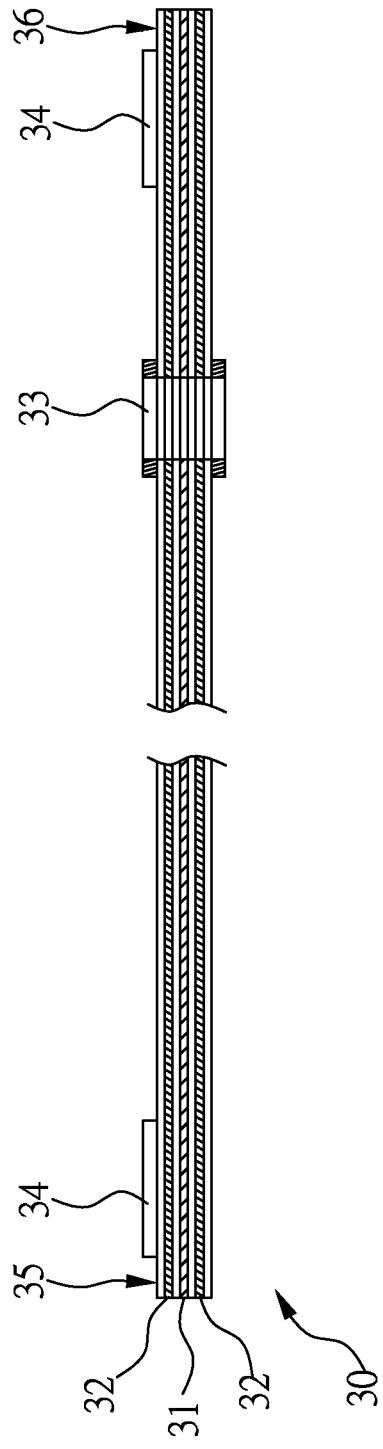
FIG. 4 illustrates a schematic drawing of the multiple-layer connecting card of the first embodiment of the present invention.
Figure 5:
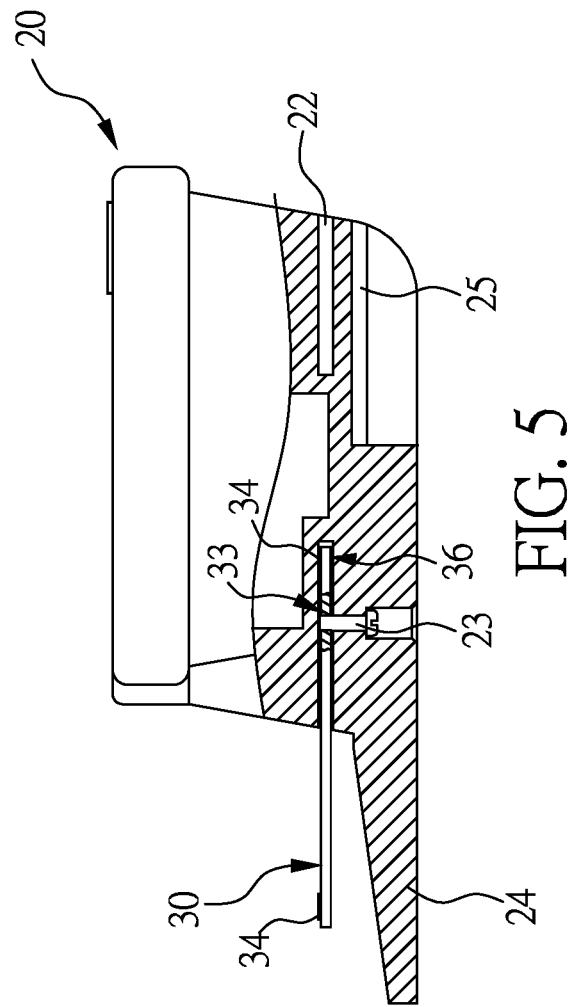
FIG. 5 illustrates a schematic drawing of the expansion device and the multiple-layer connecting card of the first embodiment of the present invention fastened to each other.
Figure 6:
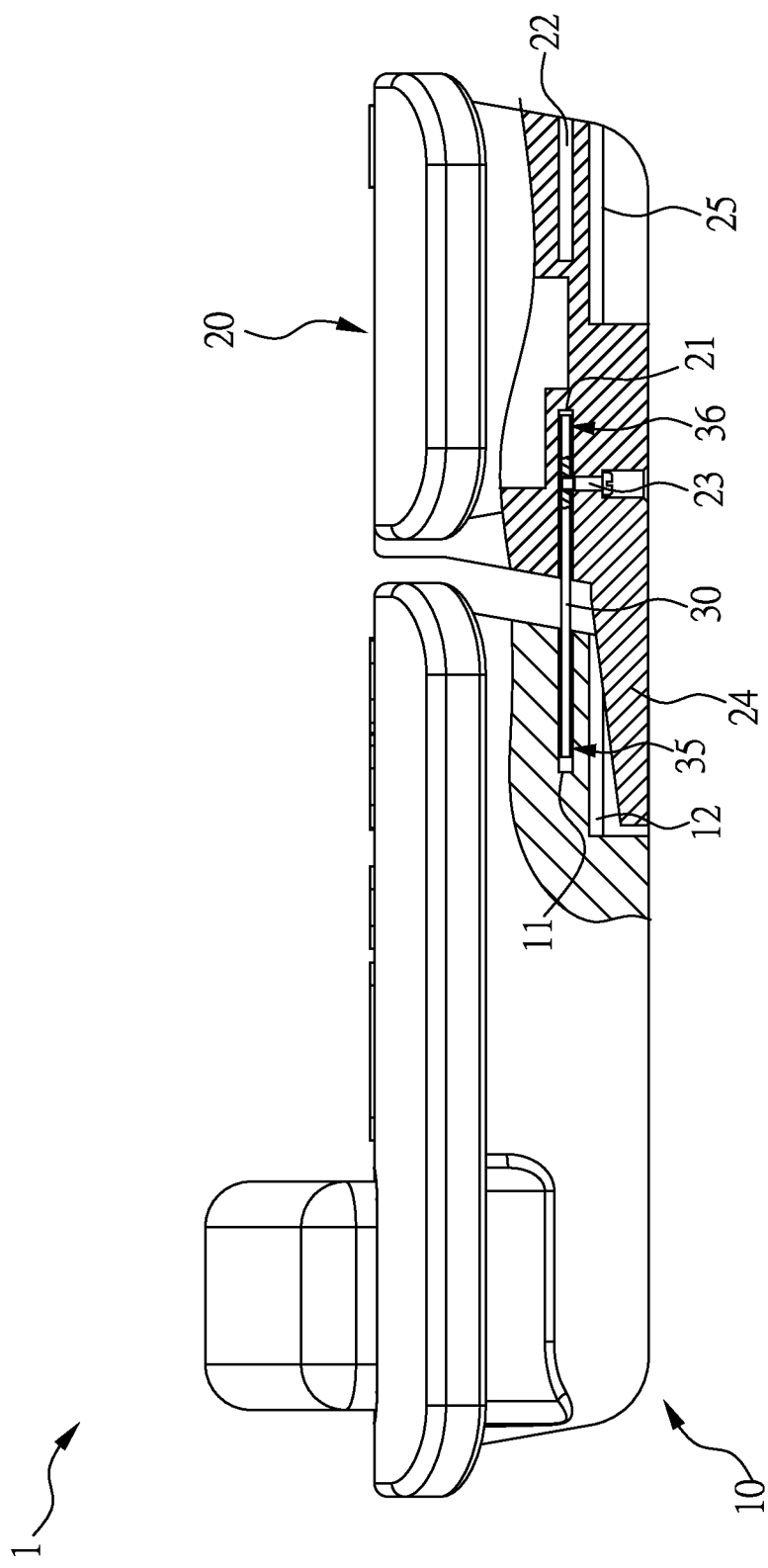
FIG. 6 illustrates a partial cross-sectional view of the first embodiment of the internet phone system of the present invention.
Figure 7:
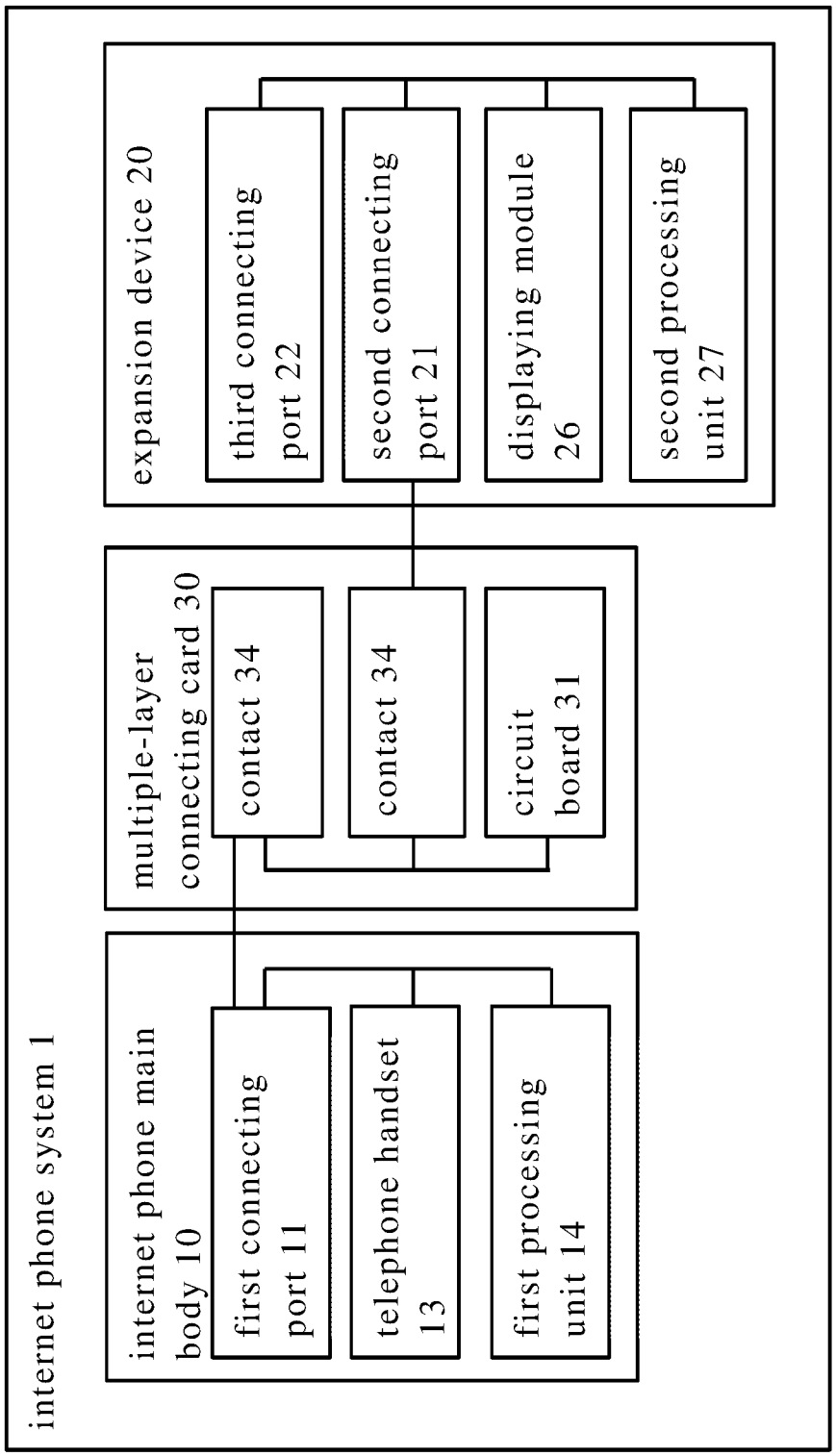
FIG. 7 illustrates a system drawing of the first embodiment of the internet phone system of the present invention.

Please refer to FIG. 2 to FIG. 7 regarding the first embodiment of the internet phone system of the present invention. FIG. 2 illustrates a schematic drawing of the first embodiment of the internet phone system of the present invention. FIG. 3 illustrates an exploded perspective view of the first embodiment of the internet phone system of the present invention. FIG. 4 illustrates a schematic drawing of the multiple-layer connecting card of the first embodiment of the present invention. FIG. 5 illustrates a schematic drawing of the expansion device and the multiple-layer connecting card of the first embodiment of the present invention fastened to each other. FIG. 6 illustrates a partial cross-sectional view of the first embodiment of the internet phone system of the present invention. FIG. 7 illustrates a system drawing of the first embodiment of the internet phone system of the present invention.

As shown in FIG. 2, in the first embodiment of the present invention, the internet phone system 1 is a device employing Voice over IP (VOIP) function for allowing a user to talk with at least one interlocutor via the internet. The internet phone system 1 includes an internet phone main body 10, an expansion device 20 and a multiple-layer connecting card 30.

As shown in FIG. 3, FIG. 6 and FIG. 7, in the first embodiment of the present invention, the internet phone main body 10 is used for allowing the user to talk to at least one interlocutor via the internet. The internet phone main body 10 includes a first connecting port 11, two first holding units 12, a telephone handset 13 and a first processing unit 14. The first connecting port 11 is provided for connecting the first end of the multiple-layer connecting card 30. The first connecting port 11 can be a slot where the multiple-layer connecting card 30 plugged into. A metal contact (not shown in the figure) is located in the first connecting port 11, the metal contact is electrically connected to the first processing unit 14, and the metal contact is used for electrically connecting to the multiple-layer connecting card 30 when the multiple-layer connecting card 30 is plugged into the first connecting port 11. It is to be noted that the metal contact for providing the electrically connection function is already disclosed in the field of electronic devices, so there is no need for further description. Two first holding units 12 are used for fastening to the expansion device 20. However, the quantity of the first holding unit 12 is not limited to two; the quantity can be changed according to design requirements. The telephone handset 13 is used for receiving the voice of the user and for playing the voice of the at least one interlocutor to the user such that the user can talk with the at least one interlocutor. The first processing unit 14 is electrically connected to the metal contact of the first connecting port 11 and the telephone handset 13 so as to transfer the electronic signal to the first connecting port 11 and telephone handset 13, and to control the first connecting port 11 and the telephone handset 13.

As shown in FIG. 3, FIG. 6 and FIG. 7, in the first embodiment of the present invention, the expansion device 20 is used for electrically connecting to the internet phone main body 10 to provide an assisting communication function to the internet phone main body 10. In the first embodiment, the expansion 20 has a monitor to display communication information, such as the phone number, the talking time, etc. However, the type of the assisting communication function is not limited to. The expansion device 20 further includes a second connecting port 21, a third connecting port 22, a fastening unit 23, two holding plates 24, two second holding units 25, a displaying module 26 and a second processing unit 27. The second connecting port 21 is provided for connecting the other end of the multiple-layer connecting card 30. There is a metal contact (not shown in the figure) located in the second connecting port 21, the metal contact is electrically connected to the second processing unit 27. The metal contact is used for electrically connecting to the multiple-layer connecting card 30 when the other end of the multiple-layer connecting card 30 is connecting to the second connecting port 21. The third connecting port 22 is provided for connecting another device; for example, the third connecting port 22 of the expansion device 20 is capable of connecting another multiple-layer connecting card for combining with another expansion device. A metal contact (not shown in the figure) is located in the third connecting port 22, and the metal contact is electrically connected to the second processing unit 27. The second connecting port 21 and the third connecting port 22 can both be slots for plugging the multiple-layer connecting card 30. The fastening unit 23 can be a screw for fastening to the multiple-layer connecting card 30 when the other end of the multiple-layer connecting card 30 is plugged into the second connecting port 21. Two holding plates 24 are used for fastening to the two first holding units 12 such that the internet phone main body 10 and the expansion device 20 can be stably combined. However, the quantity of the holding plates 24 is not limited to two; the quantity of the holding plates 24 can be changed according to the quantity of the first holding units 12. Two second holding units 25 are used for fastening to other external devices. However, the quantity of the second holding units 25 is not limited to two; the quantity can be changed according to design requirements. The displaying module 26 is a monitor for displaying communication information so that the user can view the communication information while using the internet phone main body 10 to talk. The second processing unit 27 is electrically connected to the metal contact of the second connecting port 21, the metal contact of the third connecting port 22 and the displaying module 26 to transfer electronic signals and control thereto.

As shown in FIG. 4, FIG. 6 and FIG. 7, in the first embodiment of the present invention, the two ends of the multiple-layer connecting card 30 are used for respectively connecting the first connecting port 11 and the second connecting port 21 such that the internet phone main body 10 can be electrically connected to the expansion device 20 via the multiple-layer connecting card 30. The multiple-layer connecting card 30 includes a circuit board 31, two metal plates 32, a fastening hole 33, two contacts 34 and two opposite ends (such as the first end 35 and the second end 36 shown in FIG. 4). It is to be known that the number of the layers of the multiple-layer connecting card 30 can be changed according to design requirements.

The circuit board 31 is electrically connected to the metal contact of the first connecting port 11 of the internet phone main body 10, the metal contact of the second connecting port 21 of the expansion device 20 and two contacts 34 such that the internet phone main body 10 and the expansion device 20 can be electrically connected to each other. The circuit board 31 is located between the two metal plates 32, and the two metal plates 32 are used for shielding the circuit board 31 to reduce the electromagnetic interference (EMI) generated by the circuit board 31. Actual experiments have shown that the shielding of the two metal plates 32 can drastically decrease the electromagnetic interference generated by the circuit board 31 to comply with the safety standards of electromagnetic interference. The fastening hole 33 can be a screw hole which penetrates the two metal plates 32 and the circuit board 31. The screw hole is used for fastening to the screw when the other end of the multiple-layer connecting card 30 is plugged into the second connecting port 21. However, the types of the fastening unit 23 and the fastening hole 33 are not limited to the abovementioned description; they can also be other kinds of units with a fastening function. The two contacts 34 are protruding metal sheets. The two contacts 34 are respectively located at the first end 35 and the second end 36 of the multiple-layer connecting card 30, and the two contacts 34 are electrically connected to the circuit board 31. The circuit board 31 is electrically connected to the first processing unit 14 and the second processing unit 27 by the contacts 34 contacting the metal contact of the second connecting port 21 and the metal contact of the first connecting port 11. Therefore, the internet phone main body 10 and the expansion device 20 can be electrically connected to and transferred electrical signals to each other. The first end 35 and the second end 36 are two opposite ends. The first end 35 is provided for plugging into the first connecting port 11, and the second end 36 is provided for plugging into the second connecting port 21.

When the user needs to combine the internet phone main body 10, the expansion device 20 and the multiple-layer connecting card 30 of the present invention, as shown in FIG. 3 and FIG. 5, first of all, the second end 36 of the multiple-layer connecting card 30 is plugged into the second connecting port 21 of the expansion device 20. Then the fastening unit 23 (such as a screw) is fasten to the fastening hole 33 (such as a screw hole). Therefore, the second end 36 of the multiple-layer connecting card 30 and the second connecting port 21 can be stably combined such that the second end 36 cannot easily be removed from the second connecting port 21 by an external force. At this moment, the combination of the multiple-layer connecting card 30 and the expansion device 20 is completed. Then, as shown in FIG. 3 and FIG. 6, the first end 35 of the multiple-layer connecting card 30 is plugged into the first connecting port 11 of the internet phone main body 10 and the two first holding units 12 are fastened to the two holding plates 24. Therefore, the first end 35 of the multiple-layer connecting card 30 and the first connecting port 11 can be combined such that the internet phone main body 10 and the expansion device 20 can be stably combined via the fastening of the two first holding units 12 and the two holding plates 24. Therefore, the internet phone main body 10, the expansion device 20 and the multiple-layer connecting card 30 can be stably combined.

When the internet phone main body 10, the expansion device 20 and the multiple-layer connecting card 30 are stably combined with each other, if the user uses the internet phone main body 10 to talk to at least one interlocutor, the first processing unit 14 of the internet phone main body 10 can transfer the electronic signals about talking to the at least one interlocutor to the contact 34 on the first end 35 of the multiple-layer connecting card 30, which is plugged into the first connecting port 11. Via the circuit board 31 of the multiple-layer connecting card 30, the electronic signal is transferred to another contact 34 on the second end 36 of the multiple-layer connecting card 30, which is plugged into the second connecting port 21. Then the another contact 34 on the second end 36 of the multiple-layer connecting card 30, which is plugged into the second connecting port 21, will transfer the electronic signal to the second processing unit 27 of the expansion device 20. After the second processing unit 27 of the expansion device 20 receives the electronic signal sent from the internet phone main body 10, the second processing unit 27 can control the displaying module 26 to display the communication information.

Figure 8:
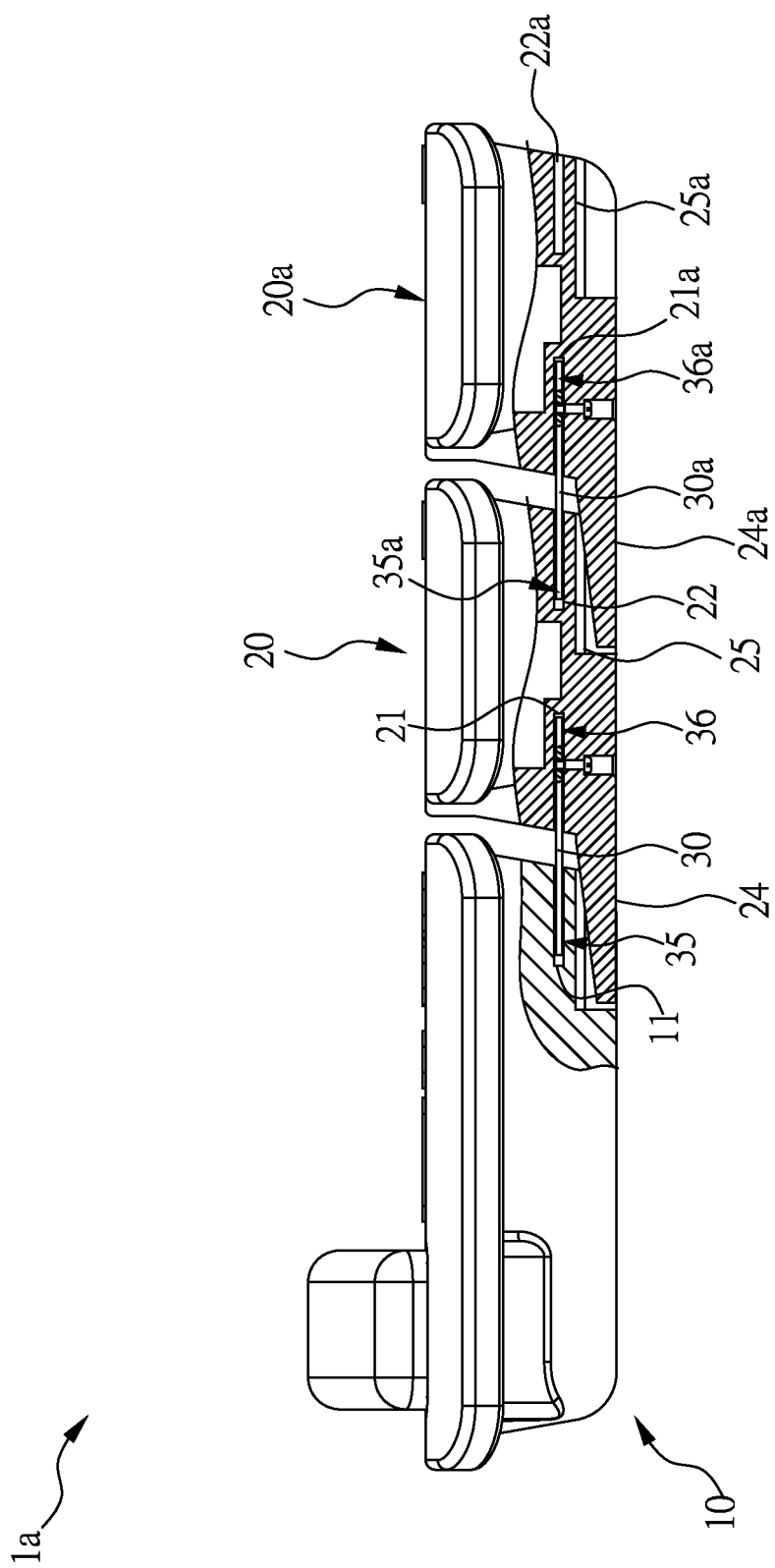
FIG. 8 illustrates a partial cross-sectional view of the second embodiment of the internet phone system of the present invention.
Figure 9:
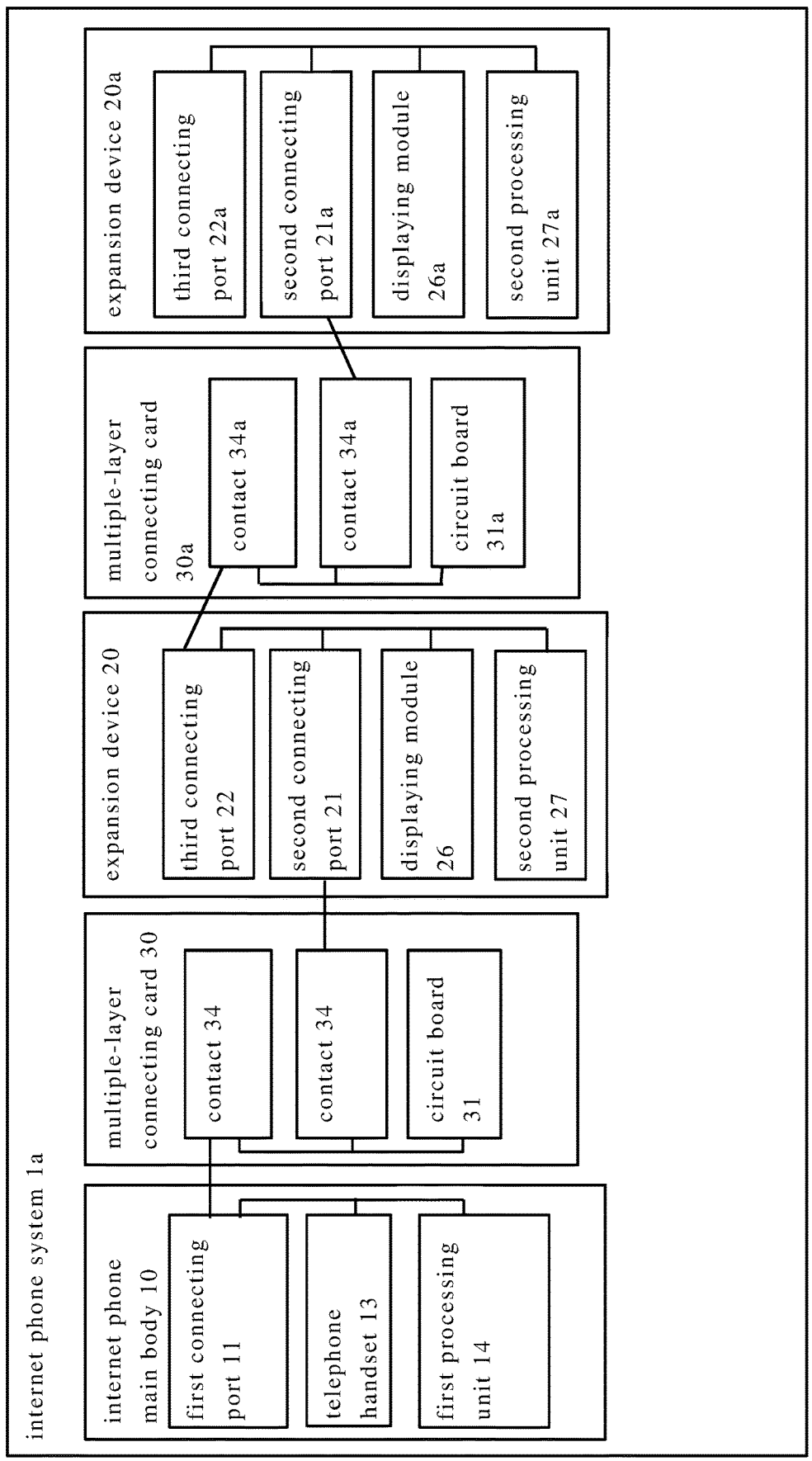
FIG. 9 illustrates a system drawing of the second embodiment of the internet phone system of the present invention.

Please refer to FIG. 8 and FIG. 9 regarding the second embodiment of the internet phone system of the present invention. FIG. 8 illustrates a partial cross-sectional view of the second embodiment of the internet phone system of the present invention. FIG. 9 illustrates a system drawing of the second embodiment of internet phone system of the present invention.

The difference between the second embodiment and the first embodiment is that, as shown in FIG. 8 and FIG. 9, in the second embodiment, the internet phone system 1*a* includes an internet phone main body 10, two expansion devices 20, 20*a* and two multiple-layer connecting cards 30, 30*a*. The first end 35 and the second end 36 of the multiple-layer connecting card 30 are respectively plugged into the first connecting port 11 of the internet phone main body 10 and the second connecting port 21 of the expansion device 20 such that the multiple-layer connecting card 30, the internet phone main body 10 and the expansion device 20 can be combined. The first end 35*a* and the second end 36*a* of the other multiple-layer connecting card 30*a* are respectively plugged into the third connecting port 22 of the expansion device 20 and the second connecting port 21*a* of the other expansion device 20*a* such that the multiple-layer connecting card 30*a*, the expansion device 20 and the other expansion device 20*a* can be combined. Meanwhile, the second holding unit 25 of the expansion device 20 and the holding plate 24*a* of the other expansion device 20*a* are fastened to each other such that the two expansion devices 20, 20*a* can be combined with each other stably. Although in this description of the second embodiment of the present invention, the quantities of the expansion devices 20, 20*a* and the multiple-layer connecting cards 30, 30*a* are limited to two, the quantity can be changed according to the design requirements, and the third connecting port 22*a* and the second holding unit 25*a* of the expansion device 20*a* can also be connected to other multiple-layer connecting cards or expansion devices. The structures of the expansion devices 20, 20*a* can be different, and the structures of the multiple-layer connecting cards 30, 30*a* can also be different.

Via the design of the internet phone system of the present invention, there is no need to use the traditional wire and RJ45 ports in the internet phone system, so the occupied space of the wire are eliminated and the electromagnetic interference is reduced. Furthermore, the expansion device of the present invention can be stably fastened to the multiple-layer connecting card and the internet phone main body. Therefore, the internet phone main body, the expansion device and the multiple-layer connecting card can be stably combined with each other.

It is noted that the embodiments described above are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. An internet phone system, comprising:
   an internet phone main body, comprising a first connecting port;
   at least one expansion device, comprising a second connecting port; and
   at least one multiple-layer connecting card, one end of the multiple-layer connecting card connected to the first connecting port, the other end of the multiple-layer connecting card connected to the second connecting port, such that the internet phone main body electrically is connected to the expansion device via the first multiple-layer connecting card;
   wherein the quantities of the at least one expansion device and the at least one multiple-layer connecting card are both plural numbers; the internet phone main body and one of the expansion devices are combined with each other by one of the multiple-layer connecting cards, and the one of the expansion devices and another expansion device are combined with each other by another multiple-layer connecting card.

2. The internet phone system as claimed in claim 1, wherein the multiple-layer connecting card comprises a circuit board and two metal plates, the circuit board is electrically connected to the internet phone main body and the expansion device, and the circuit board is located between the two metal plates.

3. The internet phone system as claimed in claim 1, wherein the multiple-layer connecting card further comprises a fastening hole, the expansion device further comprises a fastening unit, the fastening unit passes through the fastening hole, such that the multiple-layer connecting card is fastened to the expansion device.

4. The internet phone system as claimed in claim 3, wherein the fastening unit is a screw and the fastening hole is a screw hole.

5. The internet phone system as claimed in claim 1, wherein the multiple-layer connecting card further comprises two contacts, the two contacts are respectively located at two opposite ends of the multiple-layer connecting card.

6. The internet phone system as claimed in claim 1, wherein the internet phone main body further comprises at least one first holding unit, and the expansion device further comprises at least one holding plate, the at least one holding plate and the at least one first holding unit are fastened to each other.

7. The internet phone system as claimed in claim 1, wherein the expansion device further comprises a third connecting port, the third connecting port is provided for connecting the another multiple-layer connecting card.

8. The internet phone system as claimed in claim 7, wherein two opposite ends of the another multiple-layer connecting card are respectively connected to the third connecting port of the expansion device and the second connecting port of the another expansion device.

9. The internet phone system as claimed in claim 6, wherein the expansion device further comprises at least one second holding unit, the at least one second holding unit and the at least one holding plate of the another expansion device are fastened to each other.

\* \* \* \* \*